United States Patent
Ono et al.

(10) Patent No.: US 10,527,518 B2
(45) Date of Patent: Jan. 7, 2020

(54) WAVEFRONT MEASUREMENT DEVICE AND OPTICAL SYSTEM ASSEMBLY DEVICE

(71) Applicant: Mitsubishi Electric Corporation, Tokyo (JP)

(72) Inventors: Hitomi Ono, Tokyo (JP); Jiro Suzuki, Tokyo (JP); Yoshichika Miwa, Tokyo (JP); Toshiyuki Ando, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/311,624

(22) PCT Filed: Aug. 22, 2016

(86) PCT No.: PCT/JP2016/074360
§ 371 (c)(1),
(2) Date: Dec. 19, 2018

(87) PCT Pub. No.: WO2018/037448
PCT Pub. Date: Mar. 1, 2018

(65) Prior Publication Data
US 2019/0242783 A1    Aug. 8, 2019

(51) Int. Cl.
*G01J 9/00*    (2006.01)
*G01M 11/02*    (2006.01)

(52) U.S. Cl.
CPC .......... *G01M 11/0257* (2013.01); *G01J 9/00* (2013.01); *G01M 11/02* (2013.01); *G01M 11/0207* (2013.01)

(58) Field of Classification Search
CPC ....... G01M 11/0257; G01M 11/02; G01J 9/00
(Continued)

(56) References Cited

U.S. PATENT DOCUMENTS 5,321,259 A * 6/1994 Morgan ............... B23K 9/1274
250/236
7,520,613 B2    4/2009 Saito et al.
2012/0019813 A1    1/2012 Yoshitake et al.

FOREIGN PATENT DOCUMENTS

JP    2006-32692 A    2/2006
JP    2007-240168 A    9/2007
(Continued)

OTHER PUBLICATIONS

International Search Report issued in PCT/JP2016/074360 (PCT/ISA/210), dated Nov. 8, 2016.
(Continued)

*Primary Examiner* — Roy M Punnoose
(74) *Attorney, Agent, or Firm* — Birch, Stewart, Kolasch & Birch, LLP (57) ABSTRACT

A light source system (26) illuminating an optical system to be inspected (3) and making light fluxes of a plurality of wavefront measurement visual fields be emitted from the optical system to be inspected; a single wavefront sensor (28) calculating wavefront aberration on a basis of measurement of the light fluxes of the plurality of wavefront measurement visual fields emitted from the optical system to be inspected (3); and an optical path optical system (31) are included. The optical path optical system selectively makes the light fluxes of the plurality of wavefront measurement visual fields emitted from the optical system to be inspected (3) be incident on the wavefront sensor (28).

17 Claims, 8 Drawing Sheets

(58) Field of Classification Search
USPC .......................................................... 356/124
See application file for complete search history.

(56) References Cited

FOREIGN PATENT DOCUMENTS

| JP | 2010-185803 A | 8/2010 |
| WO | WO 00/55890 A1 | 9/2000 |

OTHER PUBLICATIONS

Extended European Search Report issued in corresponding European Application No. 16914123.1 dated Jul. 25, 2019.

* cited by examiner

FIG. 12

# WAVEFRONT MEASUREMENT DEVICE AND OPTICAL SYSTEM ASSEMBLY DEVICE

TECHNICAL FIELD

The present invention relates to a wavefront measurement device and an optical system assembly device used for assembly and adjustment of an optical system to be inspected.

BACKGROUND ART

In assembly and adjustment of an imaging lens, wavefront aberration is calculated by measuring a wavefront transmitted through a lens, and an amount of adjustment of the imaging lens is calculated on the basis of the calculated wavefront aberration.

Patent Literature 1 discloses an inspection device for performing wavefront measurement of an optical system to be inspected using a transmission pattern mask. In the inspection device, light fluxes corresponding to respective viewing angles at which the wavefront measurement is performed are simultaneously incident on the optical system to be inspected, using the transmission pattern mask. Then, using a Shack-Hartmann sensor as a wavefront sensor, the Shack-Hartmann sensor is arranged for each visual field, and the wavefront measurement of each visual field is performed. The Shack-Hartmann sensor includes a lens array for splitting and focusing a light flux, and an imaging element for imaging focused spots, and calculates wavefront aberration, on the basis of the arrangement of the focused spots imaged by the imaging element. By arranging the Shack-Hartmann sensor for each visual field as described above, it is possible to simultaneously calculate the wavefront aberration of the optical system to be inspected in a plurality of visual fields.

CITATION LIST

Patent Literature

Patent Literature 1: JP 2007-240168 A

SUMMARY OF INVENTION

Technical Problem

According to the inspection device of Patent Literature 1, it is possible to calculate the wavefront aberration of an optical system to be inspected in the plurality of visual fields simultaneously. However, in this configuration, the same number of imaging elements as the number of measurement visual fields is required. Since the imaging element is expensive, the use of a plurality of imaging elements is a factor of an increase in cost. In addition, when a plurality of Shack-Hartmann sensors is used, since there is a variation in characteristics for each Shack-Hartmann sensor, correction is required for the wavefront measurement result calculated for each visual field.

The present invention has been made to solve problems as described above, and it is an object of the invention to calculate wavefront aberration of an optical system to be inspected in a plurality of visual fields with a single wavefront sensor.

Solution to Problem

A wavefront measurement device according to the present invention includes: a light source system illuminating an optical system to be inspected and making light fluxes of a plurality of wavefront measurement visual fields be emitted from the optical system to be inspected; a single wavefront sensor calculating wavefront aberration on a basis of measurement of the light fluxes of the plurality of wavefront measurement visual fields emitted from the optical system to be inspected; and an optical path optical system selectively making the light fluxes of the plurality of wavefront measurement visual fields emitted from the optical system to be inspected be incident on the wavefront sensor. The optical system is arranged such that the light fluxes of the plurality of wavefront measurement visual fields emitted from the optical system to be inspected travel in different light paths, and at least on of the light fluxes is incident on the wavefront sensor via a return plane mirror and a wedge prism.

Advantageous Effects of Invention

According to the present invention, the wavefront aberration of the optical system to be inspected can be calculated in the plurality of visual fields with a single wavefront sensor.

DESCRIPTION OF EMBODIMENTS

First Embodiment

Hereinafter, to explain the present invention in more detail, some embodiments for carrying out the present invention will be described with reference to the accompanying drawings.

Figure 1:
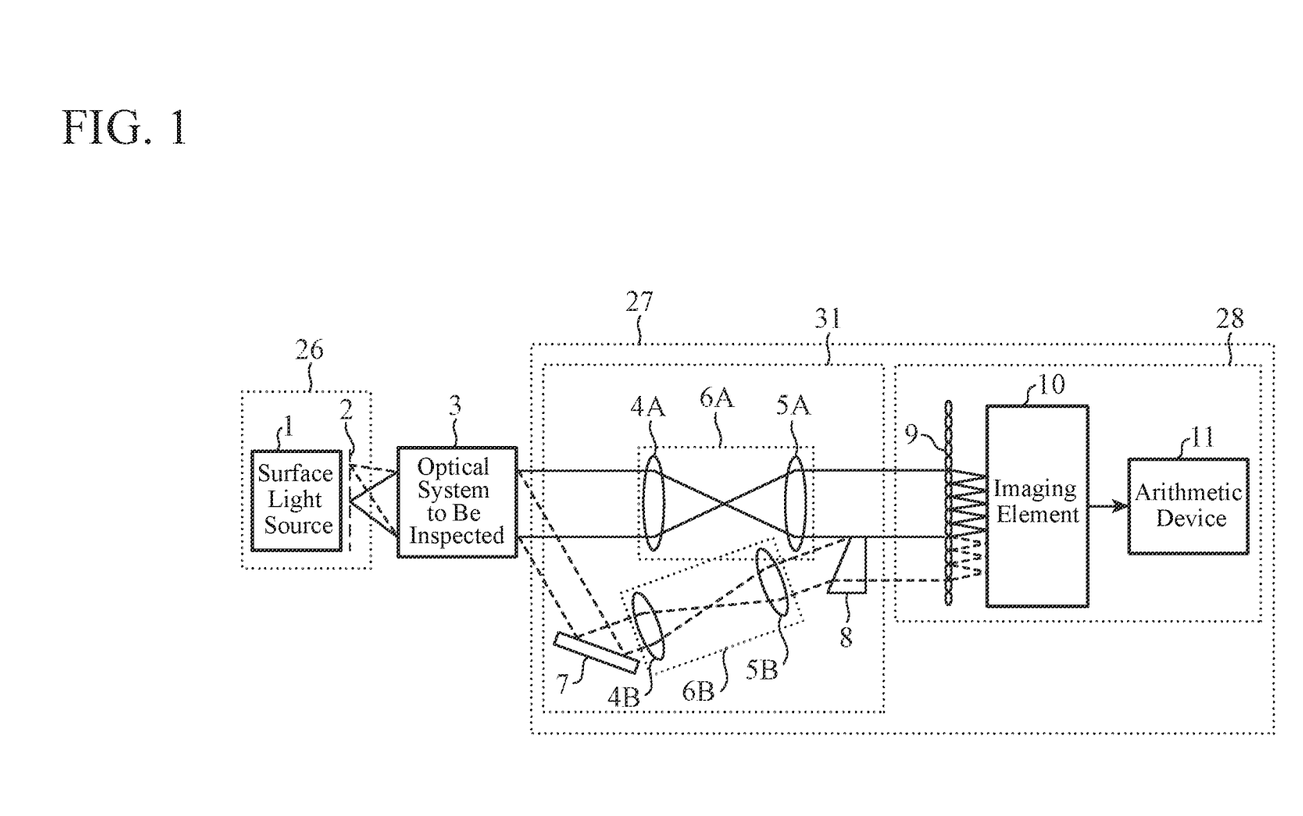
FIG. 1 is a configuration diagram illustrating a wavefront measurement device according to a first embodiment of the present invention.

FIG. 1 is a configuration diagram illustrating a wavefront measurement device according to a first embodiment of the present invention. The wavefront measurement device according to the first embodiment includes a surface light source 1, a transmission pattern mask 2, image transfer means 6A and 6B, a folding plane mirror 7, a wedge prism 8, a lens array 9, an imaging element 10, and an arithmetic device 11.

Figure 2:
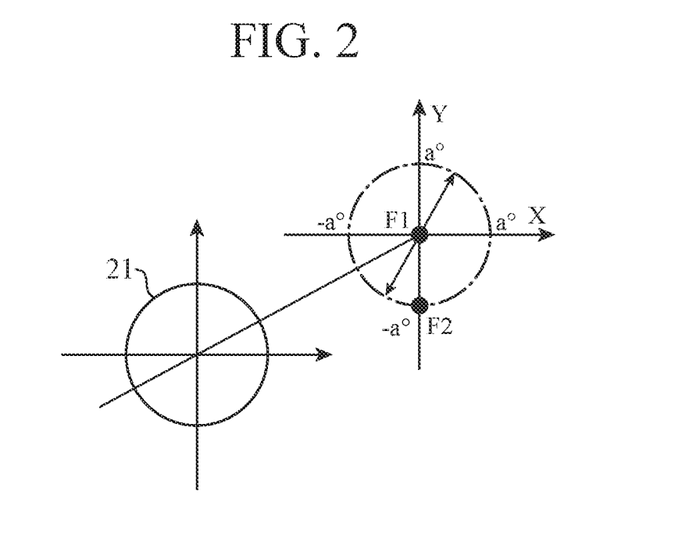
FIG. 2 is an explanatory diagram illustrating wavefront measurement visual fields of an optical system to be inspected 3 in the first embodiment.

An object of the wavefront measurement device according to the first embodiment is to calculate wavefront aberration by making an optical system to be inspected 3 emit a plurality of light fluxes, and simultaneously measuring wavefronts of the plurality of light fluxes. On the emission side of the optical system to be inspected 3, an angle of emitted light with respect to an optical axis of the optical system to be inspected 3 is defined as a visual field. As illustrated in FIG. 2, the visual field is represented by angles in the x direction and the y direction, respectively, on a plane perpendicular to the optical axis of the optical system to be inspected 3. Hereinafter, the angles are referred to as angles of view.

The surface light source 1 illuminates the optical system to be inspected 3. As an example, an LED can be used as the surface light source 1. The illuminance of the surface light source 1 is desirably uniform. As for the wavelength of the surface light source 1, a wavelength to be used for the optical system to be inspected 3 after assembly and adjustment is selected.

The transmission pattern mask 2 is illuminated by the surface light source 1, and splits light emitted from the surface light source 1. The transmission pattern mask 2 is arranged to be aligned with high accuracy on a designed image plane of the optical system to be inspected 3. The transmission pattern mask 2 includes a plurality of through holes. The light emitted from the surface light source 1 is split by passing through each through hole of the transmission pattern mask 2. The light passing through each through hole becomes incident light on the optical system to be inspected 3. Through holes of the transmission pattern mask 2 are provided so that light fluxes emitted from the optical system to be inspected 3 become light fluxes of the wavefront measurement visual fields. The surface light source 1 and the transmission pattern mask 2 form a light source system 26.

FIG. 2 illustrates a lens 21 forming the optical system to be inspected 3 and its wavefront measurement visual fields.

In the first embodiment, a plurality of wavefront measurement visual fields of the optical system to be inspected 3 is assumed to be a visual field F1 (angle of view (x, y)=(0°, 0°)) and a visual field F2 (angle of view (x, y)=(0°, −a°)).

Generally, in comparison with the wavefront aberration of the light flux emitted coaxially with the optical axis of the optical system to be inspected 3, wavefront aberration increases as a light flux is emitted at a wider angle from the optical system to be inspected 3. Therefore, by setting the visual field F2 to measure a wavefront of a light flux emitted at a wide angle from the optical system to be inspected 3, accuracy of the wavefront measurement can be enhanced.

Figure 3:
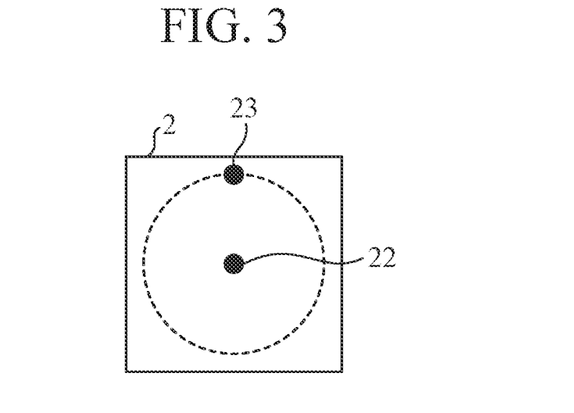
FIG. 3 is an explanatory diagram illustrating a transmission pattern mask 2 in the first embodiment.

FIG. 3 illustrates the transmission pattern mask 2 in the first embodiment. The transmission pattern mask 2 is provided with a through hole 22 for making a light flux of the visual field F1 be emitted from the optical system to be inspected 3, and a through hole 23 for making a light flux of the visual field F2 be emitted from the optical system to be inspected 3. As a result, the light flux of the visual field F2 is emitted at a wide angle from the optical system to be inspected 3.

The optical system to be inspected 3 is an optical system to be subjected to assembly and adjustment by the wavefront measurement device according to the first embodiment. The optical system to be inspected 3 includes a plurality of refractive optical elements (lenses 21).

The image transfer means 6A and 6B are each arranged on an optical path of the light flux emitted from the optical system to be inspected 3. Each of the image transfer means 6A and 6B includes two lenses. Here, the image transfer means 6A is arranged so that the optical axis of the image transfer means 6A coincides with the optical axis of one light flux out of the plurality of light fluxes emitted from the optical system to be inspected 3. In addition, the image transfer means 6B is arranged so that the optical axis of the image transfer means 6B coincides with the optical axis of another light flux out of the plurality of light fluxes emitted from the optical system to be inspected 3.

As illustrated in FIG. 1, the image transfer means 6A includes lenses 4A and 5A. The image transfer means 6A is arranged on the optical path of the light flux of the visual field F1. The image transfer means 6A is set so that an emission surface of the optical system to be inspected 3 and an incident surface of the lens array 9 are optically conjugate to each other. As a result, an image on the emission surface of the optical system to be inspected 3 is transferred to the lens array 9.

As illustrated in FIG. 1, the folding plane mirror 7 is arranged to reflect the light flux of the visual field F2 emitted at a wide angle from the optical system to be inspected 3. Reflected light of the folding plane mirror 7 becomes incident light on the image transfer means 6B.

As illustrated in FIG. 1, the image transfer means 6B includes lenses 4B and 5B. The image transfer means 6B is arranged at a position on the optical path of the light flux of the visual field F2 and between the folding plane mirror 7 and the wedge prism 8. The image transfer means 6B is arranged so that the emission surface of the optical system to be inspected 3 and the incident surface of the lens array 9 are optically conjugate to each other. As a result, an image on the emission surface of the optical system to be inspected 3 is transferred to the lens array 9 via the wedge prism 8.

The wedge prism 8 refracts and emits an incident light flux. In the first embodiment, the light flux of the visual field F1 is emitted coaxially with the optical axis of the optical system to be inspected 3 from the optical system to be inspected 3, transmitted through the image transfer means 6A, and incident on the lens array 9. In addition, the light flux of the visual field F2 is emitted at the wide angle from the optical system to be inspected 3, reflected by the folding plane mirror 7, transmitted through the image transfer means 6B, and incident on the wedge prism 8. The wedge prism 8 refracts the light flux of the visual field F2 so that the light flux of the visual field F2 refracted by the wedge prism 8 becomes a light flux parallel to and not overlapping with the light flux of the visual field F1. As a result, the light flux of the visual field F2 becomes the light flux parallel to and not overlapping with the light flux of the visual field F1, is emitted from the wedge prism 8, and is incident on the lens array 9.

The lens array 9 splits the light flux of the visual field F1 and focuses partial light fluxes generated by being split on the imaging element 10. In addition, the lens array 9 splits the light flux of the visual field F2, and focuses partial light fluxes generated by being split on the imaging element 10. As illustrated in FIG. 1, the lens array 9 is arranged so that the incident surface of the light fluxes is perpendicular to the optical axis of the optical system to be inspected 3.

The imaging element 10 images each partial light flux (hereinafter referred to as "focused spot") focused on the imaging element 10 by the lens array 9. The imaging element 10 is arranged so that the distance from the lens array 9 to the imaging surface of the imaging element 10 is equal to the focal length of each lens of the lens array 9. As an examples of the imaging element 10, a charge coupled device (CCD) camera can be used.

Figure 4:
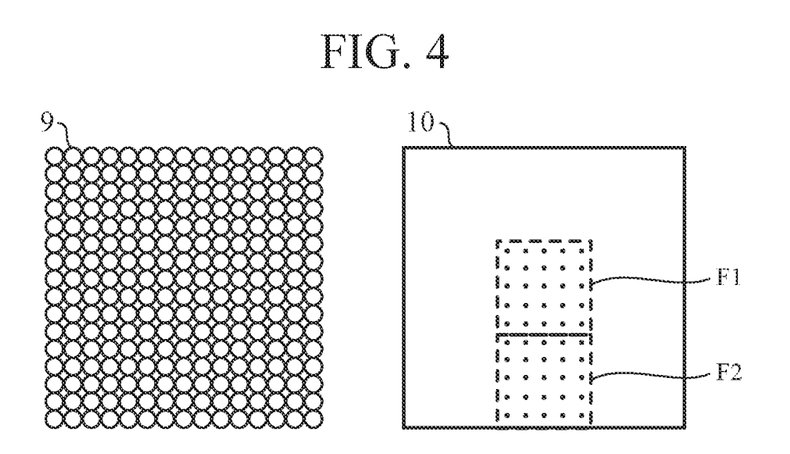
FIG. 4 is an explanatory diagram illustrating a lens array 9 and an image imaged by an imaging element 10 in the first embodiment.

FIG. 4 illustrates the lens array 9, and an example of an image imaged by the imaging element 10. In the image imaged by the imaging element 10, a plurality of focused spots generated by the light flux of the visual field F1 and a plurality of focused spots generated by the light flux of the visual field F2 appear. As described above, the light flux of the visual field F1 and the light flux of the visual field F2 are incident on the lens array 9 in parallel to and without overlapping with each other, so that in the image imaged by the imaging element 10, the focused spots generated by the light flux of the visual field F1 and the focused spots generated by the light flux of the visual field F2 do not overlap with each other.

The image imaged by the imaging element 10 is input to the arithmetic device 11. The arithmetic device 11 calculates wavefront aberration on the basis of the image imaged by the imaging element 10. The arithmetic device 11 cuts out a portion where the focused spots of the visual field F1 appear and a portion where the focused spots of the visual field F2 appear by dividing the image imaged by the imaging element 10, and acquires the cut out images as divided images. For example, the divided images correspond to two substantially square areas indicated by chain lines in FIG. 4, respectively. Then, the arithmetic device 11 calculates the wavefront aberration for each of the acquired divided images.

The lens array 9, the imaging element 10, and the arithmetic device 11 form a wavefront sensor 28.

The image transfer means 6A and 6B, the folding plane mirror 7, the wedge prism 8 and the wavefront sensor 28 form a wavefront measurement system 27.

The image transfer means 6A and 6B, the folding plane mirror 7, and the wedge prism 8 form an optical path optical system 31.

In a case where no wavefront aberration exists in the light flux emitted from the optical system to be inspected 3, a wavefront measured by the wavefront sensor 28 is a plane. On the other hand, in a case where wavefront aberration exists in the light flux emitted from the optical system to be inspected 3, a wavefront measured by the wavefront sensor 28 is nonplanar.

Figure 5A:
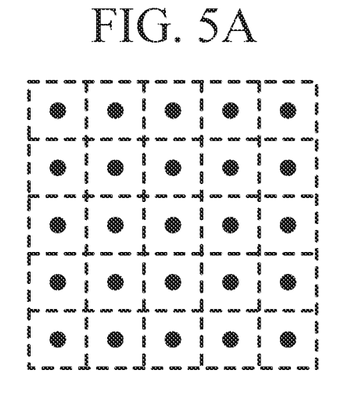
FIG. 5A is an explanatory diagram illustrating an arrangement of focused spots in a case where no wavefront aberration exists.
Figure 5B:
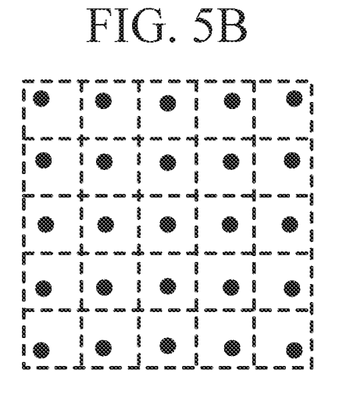
FIG. 5B is an explanatory diagram illustrating a difference in the arrangement of focused spots in a case where wavefront aberration exists.

FIG. 5 illustrates a difference in the arrangement of focused spots focused on the imaging element 10 in the case where some wavefront aberration exists and in the case where no wavefront aberration exists. As illustrated in FIG. 5, the imaging surface of the imaging element 10 is divided into a lattice shape to correspond to the arrangement of the plural lenses forming the lens array 9.

FIG. 5A illustrates the case where no wavefront aberration exists. The position of each of the focused spots corresponding to each partial light flux focused on the imaging element 10 is the center position of each lattice of the imaging surface.

FIG. 5B illustrates the case where some wavefront aberration exists. The position of each of the focused spots corresponding to each partial light flux focused on the imaging element 10 deviates with respect to the center position of each lattice of the imaging surface.

The arithmetic device 11 reads the deviation from the center position of each lattice of the imaging surface for the arrangement of the focused spots of each of the divided images. Then, on the basis of the read deviation, the wavefront aberration is calculated for each of the divided images, that is, for each of the wavefront measurement visual fields.

In the first embodiment, an area on the wavefront sensor 28 on which the light flux of the visual field F1 is incident is assumed to be a first area. The first area includes a point where the light flux emitted from the optical system to be inspected 3 coaxially with the optical axis of the optical system to be inspected 3 is incident on the lens array 9. Further, an area on the wavefront sensor 28 on which the light flux of the visual field F2 is incident is assumed to be a second area.

The optical path optical system 31 makes the light flux of the visual field F1 be incident on the first area on the wavefront sensor 28, and makes the light flux of the visual field F2 refracted by the wedge prism 8 be incident on the second area different from the first area, thereby selectively making the plurality of light fluxes be incident on the different areas on the wavefront sensor 28.

With such a configuration, the wavefront aberration of the optical system to be inspected 3 in the plurality of visual fields can be calculated with one wavefront sensor 28. Therefore, it is unnecessary to arrange a wavefront sensor for each wavefront measurement visual field to acquire an image as in a conventional art.

In the above description, other than the visual field F1, there is one wavefront measurement visual field F2 to be measured, but more wavefront measurement visual fields may exist. In such a case, it is sufficient that an image transfer means, a folding plane mirror, and a wedge prism corresponding to the additional wavefront measurement visual field are added.

As described above, according to the wavefront measurement device of the first embodiment, the device includes: a light source system 26 illuminating an optical system to be inspected 3 and making light fluxes of a plurality of wavefront measurement visual fields be emitted from the optical system to be inspected 3; a single wavefront sensor 28 calculating wavefront aberration on a basis of measurement of the light fluxes of the plurality of wavefront measurement visual fields emitted from the optical system to be inspected 3; and an optical path optical system 31 selectively making the light fluxes of the plurality of wavefront measurement visual fields emitted from the optical system to be inspected 3 be incident on the wavefront sensor 28. As a result, the wavefront aberration of the optical system to be inspected in the plurality of visual fields can be calculated with a single wavefront sensor.

In addition, the wavefront aberration of the optical system to be inspected in a plurality of visual fields can be substantially simultaneously calculated with the single wavefront sensor, so that the time required for adjusting the optical system to be inspected can be shortened.

Second Embodiment

Figure 6:
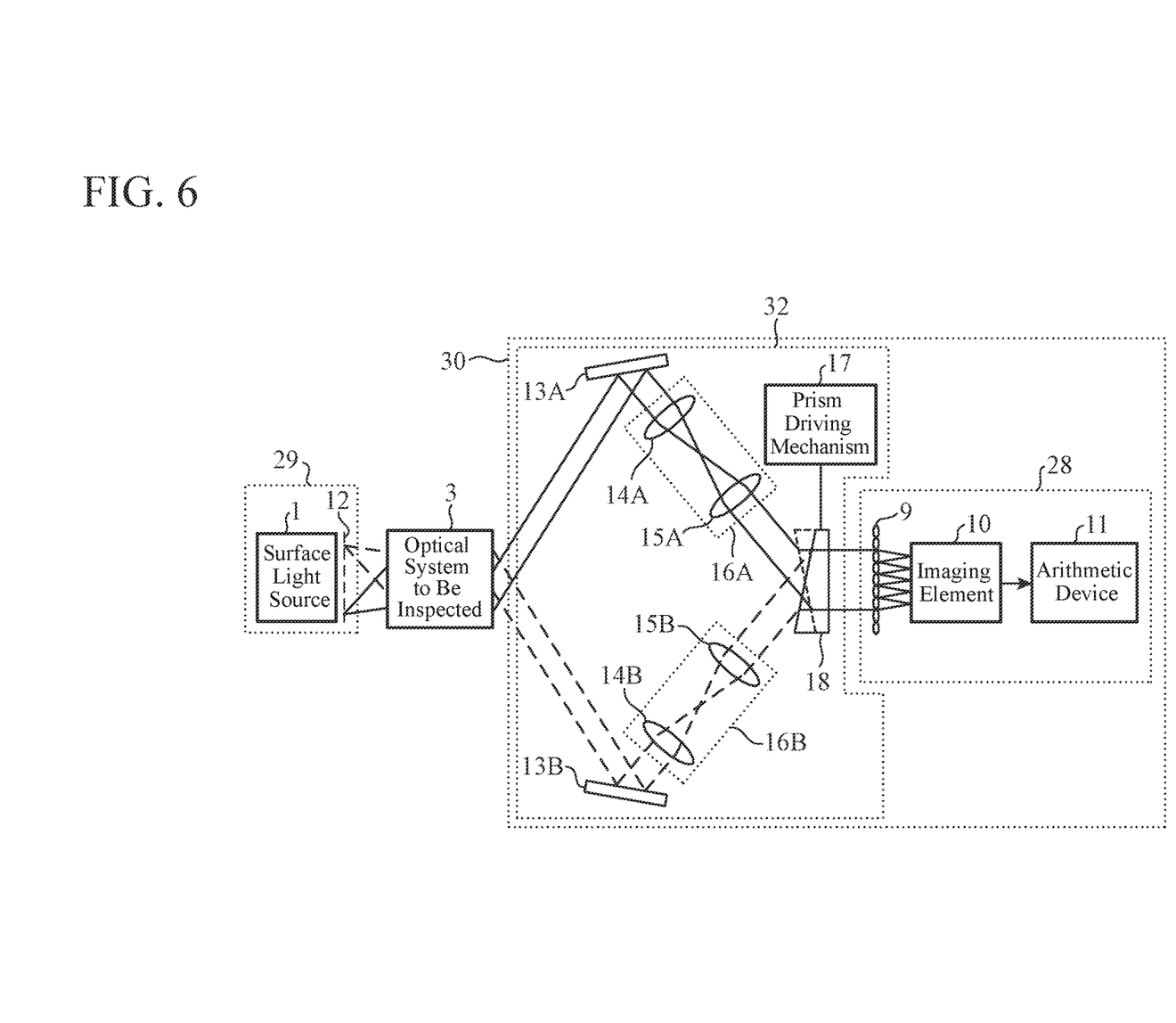
FIG. 6 is a configuration diagram illustrating a wavefront measurement device according to a second embodiment of the present invention.

FIG. 6 is a configuration diagram illustrating a wavefront measurement device according to a second embodiment of the present invention.

The wavefront measurement device according to the second embodiment differs from the wavefront measurement device according to the first embodiment illustrated in FIG. 1 in that the transmission pattern mask 2, the image transfer means 6A and 6B, the folding plane mirror 7, and the wedge prism 8 are changed to a transmission pattern mask 12, image transfer means 16A and 16B, folding plane mirrors 13A and 13B, and a wedge prism 18, respectively, and further a prism driving mechanism 17 is added.

Hereinafter, components having the functions same as or corresponding to those described in the first embodiment are denoted by the same reference numerals, and the description thereof will be omitted or simplified.

As illustrated in FIG. 6, in the second embodiment, the wedge prism 18 is arranged on the optical axis of the optical system to be inspected 3.

Figure 7:
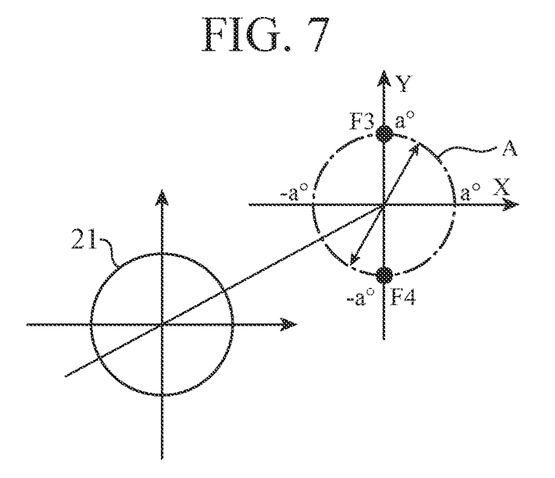
FIG. 7 is an explanatory diagram illustrating wavefront measurement visual fields of the optical system to be inspected 3 in the second embodiment.

FIG. 7 illustrates the lens 21 forming the optical system to be inspected 3 and its wavefront measurement visual fields.

In the second embodiment, a plurality of wavefront measurement visual fields of the optical system to be inspected 3 is assumed to be a visual field F3 (angle of view (x, y)=(0°, a°)) and a visual field F4 (angle of view (x, y)=(0°, −a°)), for example.

The transmission pattern mask 12 is illuminated by the surface light source 1, and splits light emitted from the surface light source 1. The transmission pattern mask 12 differs from the transmission pattern mask 2 in the first embodiment in the arrangement of the through holes. The surface light source 1 and the transmission pattern mask 12 form a light source system 29.

Figure 8:
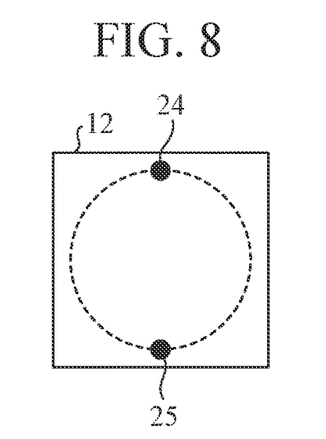
FIG. 8 is an explanatory diagram illustrating a transmission pattern mask 12 in the second embodiment.

FIG. 8 illustrates the transmission pattern mask 12 in the second embodiment. In the transmission pattern mask 2 of the first embodiment, the through holes 22 and 23 are provided for making the light fluxes of the visual fields F1 and F2 be emitted. The light flux of the visual field F1 is emitted from the optical system to be inspected 3 coaxially with the optical axis of the optical system to be inspected 3, and the light flux of the visual field F2 is emitted at a wide angle from the optical system to be inspected 3. On the other hand, in the transmission pattern mask 12 of the second embodiment, the through holes 24 and 25 are provided for making the light fluxes of the visual fields F3 and F4 be emitted. Both of the light fluxes of the visual fields F3 and F4 are emitted at wide angles from the optical system to be inspected 3.

Each of the image transfer means 16A and 16B is arranged on an optical path of the light flux emitted from the optical system to be inspected 3. Each of the image transfer means 16A and 16B includes two lenses. Here, the image transfer means 16A is arranged so that the optical axis of the image transfer means 16A coincides with the optical axis of one light flux out of the plurality of light fluxes emitted from the optical system to be inspected 3. In addition, the image transfer means 16B is arranged so that the optical axis of the image transfer means 16B coincides with the optical axis of another light flux out of the plurality of light fluxes emitted from the optical system to be inspected 3.

As illustrated in FIG. 6, the folding plane mirror 13A is arranged to reflect the light flux of the visual field F3 emitted at a wide angle from the optical system to be inspected 3. Reflected light of the folding plane mirror 13A becomes incident light on the image transfer means 16A.

The image transfer means 16A is arranged at a position on the optical path of the light flux of the visual field F3 and between the folding plane mirror 13A and the wedge prism 18. The image transfer means 16A includes lenses 14A and 15A. The image transfer means 16A is arranged so that the emission surface of the optical system to be inspected 3 and the incident surface of the lens array 9 are optically conjugate to each other. As a result of this configuration, an image on the emission surface of the optical system to be inspected 3 is transferred to the lens array 9 via the wedge prism 18.

As illustrated in FIG. 6, the folding plane mirror 13B is arranged to reflect the light flux of the visual field F4 emitted at a wide angle from the optical system to be inspected 3. Reflected light of the folding plane mirror 13B becomes incident light on the image transfer means 16B.

The image transfer means 16B is arranged at a position on the optical path of the light flux of the visual field F4 and between the folding plane mirror 13B and the wedge prism 18. The image transfer means 16B includes lenses 14B and 15B. The image transfer means 16B is arranged so that the emission surface of the optical system to be inspected 3 and the incident surface of the lens array 9 are optically conjugate to each other. As a result of this configuration, an image on the emission surface of the optical system to be inspected 3 is transferred to the lens array 9 via the wedge prism 18.

The wedge prism 18 refracts and emits incident light fluxes. In the second embodiment, the light fluxes of the visual fields F3 and F4 that are respectively reflected by the folding plane mirrors 13A and 13B and transmitted through the image transfer means 16A and 16B are incident on the wedge prism 18.

The light flux incident surface of the wedge prism 18 has an inclination with respect to a plane perpendicular to the optical axis direction of the optical system to be inspected 3. The prism driving mechanism 17 rotates the wedge prism 18 around the center of the length of the wedge prism 18 in a direction perpendicular to the optical axis direction of the optical system to be inspected 3. Accordingly, the inclined surface on the light flux incident side of the wedge prism 18 is switched.

In an example of the configuration, a rotation mechanism formed by combining a motor and a gear is used as the prism driving mechanism 1. Further, in the above description, a method of switching the inclined surface on the light flux incident side of the wedge prism 18 has been described; however, the method is not limited thereto, and the wedge prism 18 may be switched with respect to the incident light flux by another method.

The image transfer means 16, the folding plane mirrors 13A and 13B, the prism driving mechanism 17, the wedge prism 18, and the wavefront sensor 28 form a wavefront measurement system 30.

The image transfer means 16, the folding plane mirrors 13A and 13B, the prism driving mechanism 17, and the wedge prism 18 form an optical path optical system 32.

In the first embodiment, the wavefront measurement device has been described in which the light flux of the visual field F1 and the light flux of the visual field F2 are incident on the lens array 9 in parallel to each other and without overlapping with each other, and the focused spots of the respective visual fields are imaged substantially simultaneously. On the other hand, in the second embodiment, the light fluxes of the visual fields F3 and F4 are incident on the lens array 9 in a time division manner, and the focused spots of the respective visual fields are imaged in a time division manner.

In the second embodiment, when a light flux of one visual field out of the light fluxes of the visual fields F3 and F4 is incident on the lens array 9, a light flux of another visual field is not incident on the lens array 9. The wedge prism 18 refracts the light flux of one visual field out of the light fluxes of the visual field F3 and F4 to be incident on the lens array 9, and refracts the light flux of the other visual field not to be incident on the lens array 9.

The prism driving mechanism 17 selectively switches the light flux to be incident on the lens array 9 out of the light fluxes of the visual fields F3 and F4 by rotating the wedge prism 18 in a time division manner. Consequently, when the light flux of the visual field F3 is perpendicularly incident on the incident surface of the lens array 9, the light flux of the visual field F4 is not incident on the lens array 9. On the other hand, when the light flux of the visual field F4 is perpendicularly incident on the incident surface of the lens array 9, the light flux of the visual field F3 is not incident on the lens array 9. In this way, only either one of the light fluxes of the visual field F3 and F4 is incident on the lens array 9, and partial light fluxes of the incident light flux is focused on the imaging element 10.

Figure 9:
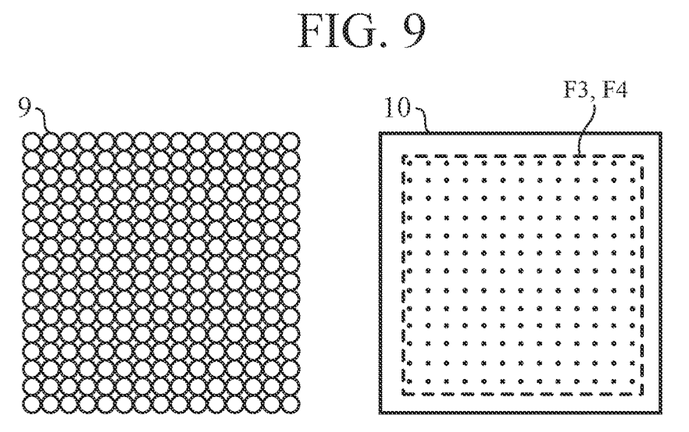
FIG. 9 is an explanatory diagram illustrating the lens array 9, and an image imaged by the imaging element 10 in the second embodiment.

FIG. 9 illustrates the lens array 9, and an example of an image imaged by the imaging element 10. In the first embodiment, the configuration has been described in which partial light fluxes of the plurality of visual fields are focused on a single imaging element 10, and the focused spots of the respective visual fields are imaged substantially simultaneously. In that case, the number of focused spots per visual field decreases. On the other hand, in the second embodiment, the focused spots of the respective visual fields are imaged in a time division manner, so that the entire imaging element 10 can be used when one visual field is measured as illustrated in FIG. 9. Therefore, the number of focused spots per visual field does not decrease. According to the second embodiment, when the lens array 9 and the imaging element 10 having the same size as a conventional wavefront measurement device are used, the resolution and accuracy of the wavefront measurement can be maintained to be equivalent to those of the conventional device.

In the above description, there are two wavefront measurement visual fields, F3 and F4, but more wavefront measurement visual fields may exist. In such a case, it is sufficient that an image transfer means and a folding plane mirror corresponding to the additional wavefront measurement visual field are added. Further, when an additional wavefront measurement visual field is provided to the measurement of the visual fields F3 and F4, a visual field to be selected is preferably a point on a circle A illustrated in FIG. 7. This is because, by setting the visual field to be a point on the circle A, the wavefront measurement of the visual field can be performed only by adjusting the rotation angle of the prism driving mechanism 17.

As described above, according to the wavefront measurement device of the second embodiment, the device includes: a light source system 26 illuminating an optical system to be inspected 3 and making light fluxes of a plurality of wavefront measurement visual fields be emitted from the optical system to be inspected 3; a single wavefront sensor 28 calculating wavefront aberration on a basis of measurement of the light fluxes of the plurality of wavefront measurement visual fields emitted from the optical system to be inspected 3; and an optical path optical system 32 selectively making the light fluxes of the plurality of wavefront measurement visual fields emitted from the optical system to be inspected 3 be incident on the wavefront sensor 28. As a result, the wavefront aberration of the optical system to be inspected in a plurality of visual fields can be calculated with a single wavefront sensor.

In addition, since the wavefront aberration of the optical system to be inspected in the plurality of visual fields can be calculated with a single wavefront sensor, the time required for adjusting the optical system to be inspected can be shortened.

Third Embodiment

In the first and second embodiments, wavefront measurement devices have been described. In the third embodiment, an optical system assembly device will be described. The optical system assembly device according to the third embodiment performs assembly and adjustment of the optical system to be inspected 3 using a wavefront measurement result obtained by the wavefront measurement device according to the first embodiment.

Figure 10:
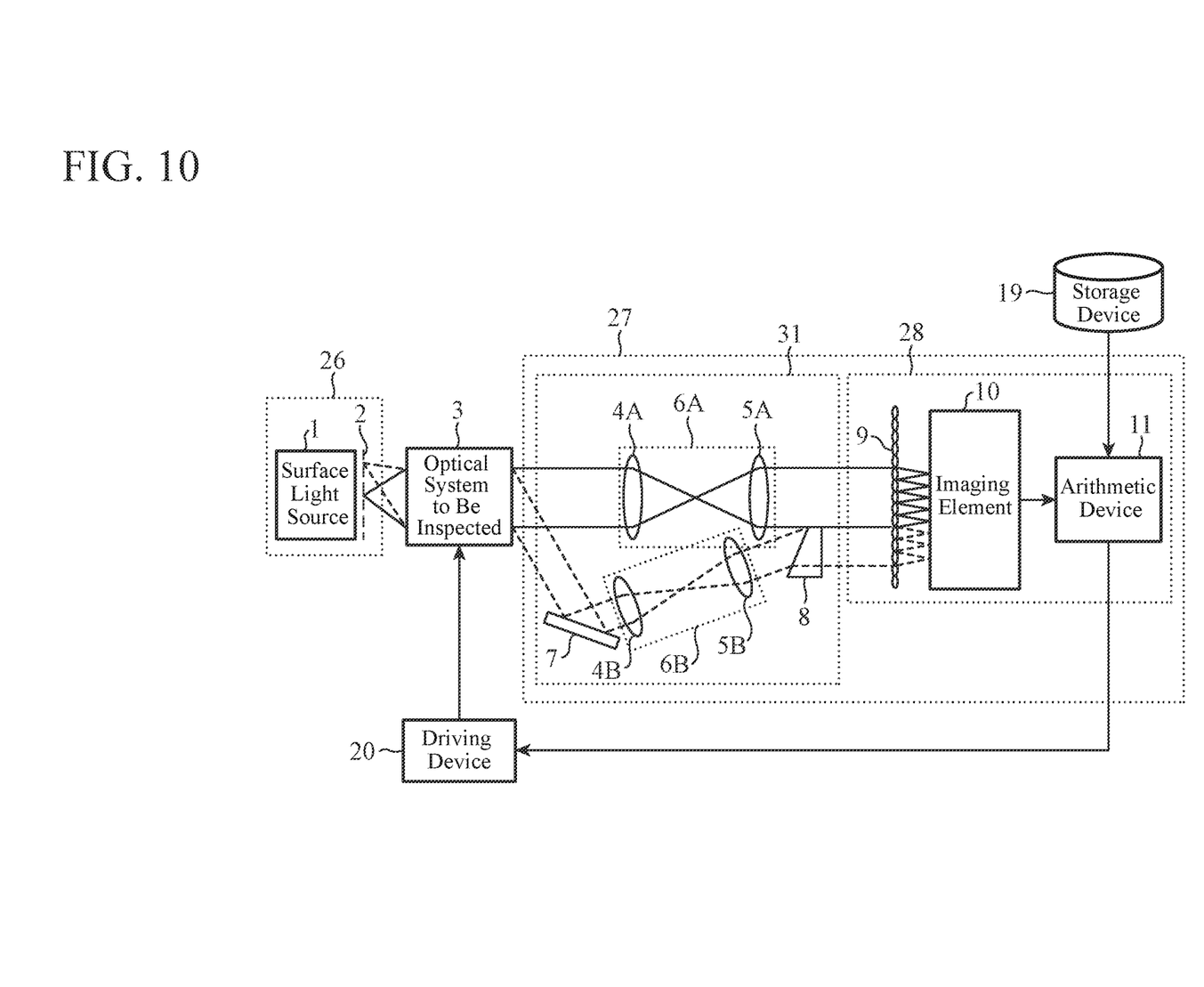
FIG. 10 is a configuration diagram illustrating an optical system assembly device according to a third embodiment of the present invention.

FIG. 10 is a configuration diagram illustrating the optical system assembly device according to the third embodiment of the present invention.

The optical system assembly device according to the third embodiment includes a storage device 19 and a driving device 20 additionally to the wavefront measurement device according to the first embodiment illustrated in FIG. 1.

Hereinafter, components having the same functions as or functions corresponding to those described in the first embodiment are denoted by the same reference numerals, and the description thereof will be omitted or simplified.

The optical system to be inspected 3 is subjected to assembly and adjustment by the optical system assembly device, and includes a plurality of refractive optical elements (lenses 21).

Figure 11:
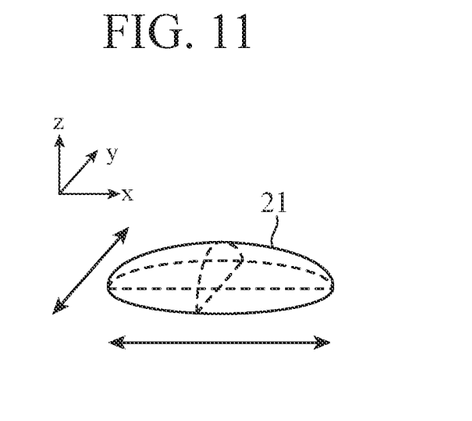
FIG. 11 is an explanatory diagram illustrating adjustment directions of the optical system to be inspected 3 in the third embodiment.

FIG. 11 illustrates adjustment directions of the optical system to be inspected 3 in the third embodiment. FIG. 11 illustrates one of the lenses 21 forming the optical system to be inspected 3. Each of the plurality of lenses forming the optical system to be inspected 3 is configured to be movable by the driving device 20, which is not illustrated in FIG. 11, in eccentric directions with respect to the optical axis of the lens, that is, in the x direction and the y direction illustrated in FIG. 11. As an example of configuration of the driving device 20, a mechanism can be used in which a lens is supported at three points, piezo elements are arranged every 90° on the circumference of the lens, and the lens is moved by changing a voltage applied to each of the piezo elements.

Next, calculation of an amount of movement of the lens adjusted by the driving device 20 in the arithmetic device 11 will be described.

The arithmetic device 11 decomposes wavefront aberration W(x, y) into a Zernike polynomial $R_n^m(\rho)$, and calculates Zernike coefficients. The relationship between the wavefront aberration W(x, y) and the Zernike polynomial $R_n^m(\rho)$ is given by the following equation (1). In the following, coefficients $A_{nm}$ of terms of the Zernike polynomial is referred to as Zernike coefficients. The symbols n and m are referred to as Zernike orders.

k represents the maximum value of the expansion orders n of the Zernike polynomial. The maximum number of terms of the Zernike polynomial to be used for expressing the wavefront aberration W(x, y) is determined in accordance with k.

$$W(x, y) = W(\rho\sin\theta, \rho\cos\theta) = \sum_{n=0}^{k}\sum_{m=-n}^{n} A_{nm} R_n^m(\rho) \begin{cases} \cos|m|\theta : m \geq 0 \\ \sin|m|\theta : m < 0 \end{cases} \quad (1)$$

ρ represents the coordinate value in the radial direction in a cylindrical coordinate system in which the ζ direction is the optical axis direction.

θ represents the coordinate value in the angular direction in the coordinate system. The relationship between the orthogonal coordinate system and the cylindrical coordinate system is expressed by the following equation (2).

$$\begin{pmatrix} x \\ y \\ z \end{pmatrix} = \begin{pmatrix} \rho\cos\theta \\ \rho\sin\theta \\ \zeta \end{pmatrix} \quad (2)$$

Assuming that there are N lenses forming the optical system to be inspected 3, and aberration sensitivities ($a_{nm}^i$, $b_{nm}^i$) with respect to eccentricity (amount of eccentricity $x_i$, $y_i$) of each i-th lens and the Zernike coefficients $A_{nm}$ satisfy the relationship of the following equation (3). The aberration sensitivities $a_{nm}^i$ and $b_{nm}^i$ are amounts of change of the Zernike coefficients of the optical system to be inspected 3 when a unit eccentricity is given to the i-th lens in each of the x direction and the y direction.

$$(a_{nm}^1 \; a_{nm}^2 \; \ldots \; a_{nm}^N \; b_{nm}^1 \; \ldots \; b_{nm}^N) \begin{pmatrix} x_1 \\ x_2 \\ \vdots \\ x_N \\ y_1 \\ \vdots \\ y_N \end{pmatrix} = A_{nm} \quad (3)$$

In the equation (3), the Zernike coefficients $A_{nm}$ are calculated by the equation (1) on the basis of the wavefront aberration W(x, y). On the other hand, the aberration sensitivities $a_{nm}^i$ and $b_{nm}^i$ of each lens are stored in the storage device 19 in advance. Thus, the amounts of eccentricity of each lens can be calculated by calculating $x_i$ and $y_i$ (i=1 to N) using the equation (3). Then, the amount of movement of the lens to be adjusted by the driving device 20 is obtained by inverting the sign of the calculated amount of eccentricity of each lens.

The number of unknown quantities in the equation (3) is 2N, and if 2N equations (3) exist, the amounts of eccentricity $x_i$ and $y_i$ can be uniquely determined. Here, the number of equations of the equation (3) is determined by two factors. One is the number of visual fields to be subjected to the wavefront measurement. The other is the number of terms of the Zernike polynomial when the wavefront aberration W(x, y) is decomposed into the Zernike polynomial and the Zernike coefficients are calculated.

Assuming that the number of wavefront measurement visual fields is C, C equations (3) can be made. In addition, assuming that the number of terms to be selected when the wavefront aberration W(x, y) is decomposed into the Zernike polynomial is D, D equations (3) can be made. Here, the relationship of the following equation (4) holds between D and k in the equation (1).

$$D = \frac{(k+1)(k+2)}{2} \quad (4)$$

Thus, the equations (3) of the total number of C and D can be obtained. By setting conditions such that the total number of the equations (3) is greater than or equal to 2N, the amounts of eccentricity $x_i$ and $y_i$ (i=1 to N) can be uniquely determined.

The arithmetic device 11 makes C equations (3) and D equations (3), and obtains simultaneous equations. Then, by solving the simultaneous equations, the amounts of eccentricity $x_i$ and $y_i$ (i=1 to N) of the lenses are calculated. As described above, the amount of movement of the lens to be adjusted by the driving device 20 is obtained by inverting the sign of the calculated amount of eccentricity of the lens.

In the storage device 19, applying voltages to the piezo elements of the driving device 20, which are required for respective movements, are stored in advance for respective amounts of movement of the lens. The arithmetic device 11 acquires the applying voltages corresponding to the calculated amounts of movement of the lens from the storage device 19, and outputs the voltages to the driving device 20. The driving device 20 applies the applying voltages input from the arithmetic device 11 to the piezo elements and moves the lens. When adjustment by the driving device 20 is completed for the plurality of lenses forming the optical system to be inspected 3, the assembly and adjustment of the optical system to be inspected 3 is ended.

In the above description, the applying voltages are stored in the storage device 19, and the lens is moved driven by the driving device 20 on the basis of the applying voltages; however, the configuration is not limited thereto. For example, the amount of movement of the lens calculated by the arithmetic device 11 may be directly input to the driving device 20, and the driving device 20 may move the lens on the basis of the amount of movement.

Figure 12:
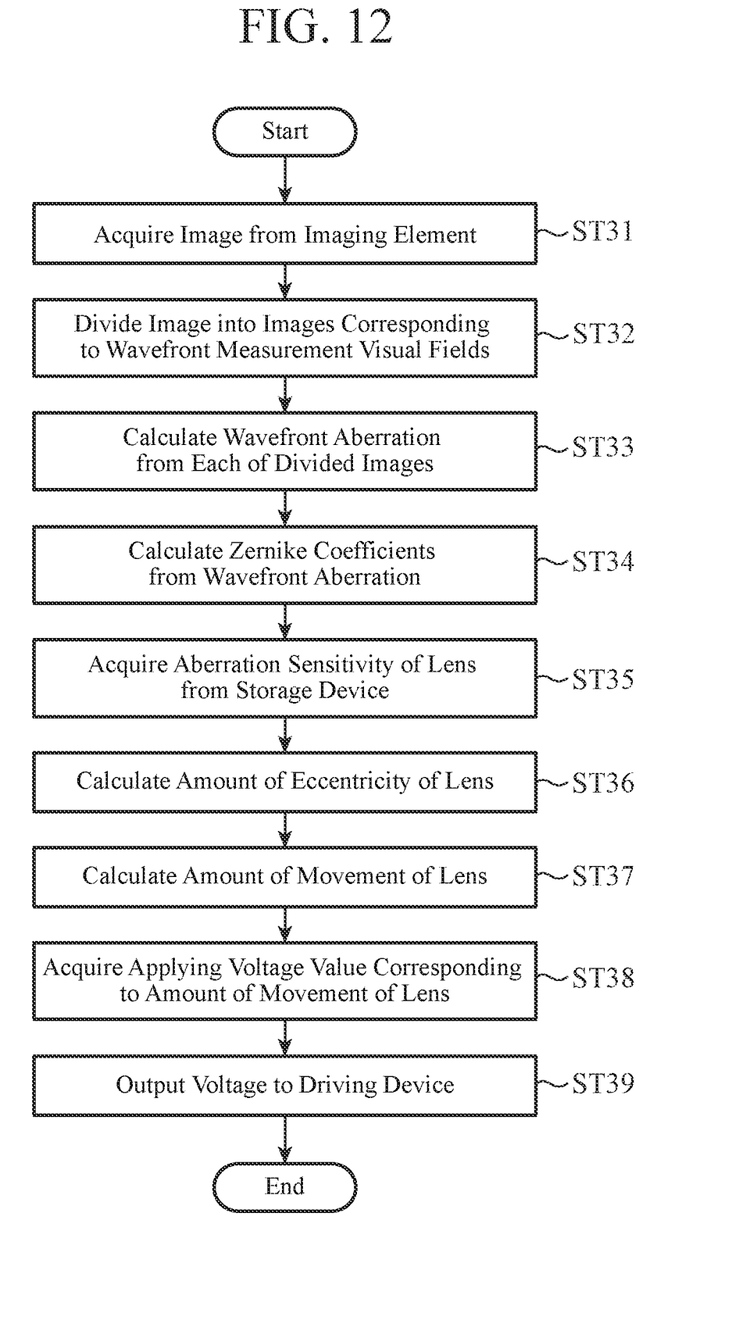
FIG. 12 is a flowchart illustrating processing details of an arithmetic device 11 in the optical system assembly device of the third embodiment.

FIG. 12 is a flowchart illustrating processing details of the arithmetic device 11 in the optical system assembly device of the third embodiment. First, the arithmetic device 11 acquires an image imaged by the imaging element 10 (step ST31). Next, the arithmetic device 11 divides the image imaged by the imaging element 10 into divided images respectively corresponding to the wavefront measurement visual fields (step ST32). Next, the arithmetic device 11 calculates wavefront aberration from an arrangement of focused spots in each of divided images (step ST33). Next, the arithmetic device 11 calculates Zernike coefficients from the calculated wavefront aberration using the equation (1) (step ST34). Next, the arithmetic device 11 acquires aberration sensitivity of a lens to be adjusted from the storage device 19 (step ST35). Next, the arithmetic device 11 calculates an amount of eccentricity of the lens using the equation (2) from the acquired aberration sensitivity of the lens and the Zernike coefficients of each of the wavefront measurement visual fields (step ST36). Next, the arithmetic device 11 calculates the amount of movement of the lens by inverting the sign of the amount of eccentricity of the lens (step ST37). Next, the arithmetic device 11 acquires an applying voltage to be applied to the driving device 20 corresponding to the amount of movement of the lens from the storage device 19 (step ST38). Next, the arithmetic device 11 outputs the applying voltage to the driving device 20 (step ST39).

In the above description, a case has been described where the optical system assembly device according to the third embodiment performs the assembly and adjustment of the optical system to be inspected 3 using the wavefront measurement result obtained by the wavefront measurement device according to the first embodiment; however, the configuration is not limited thereto, and a wavefront measurement result obtained by the wavefront measurement device according to the second embodiment may be used. That is, the light source system 26 and the wavefront measurement system 27 of the first embodiment are used as the wavefront measurement device, but instead of such a configuration, the light source system 29 and the wavefront measurement system 30 of the second embodiment may be used. In this case, step ST32 is not required.

As described above, according to the optical system assembly device of the third embodiment, the device includes: an optical system to be inspected 3 which is subjected to wavefront measurement; a light source system 26 illuminating the optical system to be inspected 3 and making light fluxes of a plurality of wavefront measurement visual fields be emitted from the optical system to be inspected 3; a single wavefront sensor 28 calculating wavefront aberration on a basis of measurement of the light fluxes of the plurality of wavefront measurement visual fields emitted from the optical system to be inspected 3; an optical path optical system 3 selectively making the light fluxes of the plurality of wavefront measurement visual fields emitted from the optical system to be inspected be incident on the wavefront sensor 28; and a driving device 20 moving the optical system to be inspected 3 on a basis of an amount of movement of the optical system to be inspected 3 calculated by the wavefront sensor 28 using the wavefront aberration and an aberration sensitivity of the optical system to be inspected 3. As a result, the wavefront aberration of the optical system to be inspected 3 can be calculated in the plurality of visual fields with the single wavefront sensor 28.

In the arithmetic device 11, the amount of movement of the optical system to be inspected 3 can be uniquely determined from the calculated wavefront aberration and the aberration sensitivity acquired from the storage device. As a result, the number of processing steps in the assembly of the optical system can be reduced, and the time required for adjusting the optical system to be inspected can be shortened.

In addition, when the light source system 26 and the wavefront measurement system 27 according to the first embodiment are used, the wavefront aberration of the optical system to be inspected in the plurality of visual fields can be substantially simultaneously calculated with a single wavefront sensor, so that the time required for adjusting the optical system to be inspected can be further shortened.

Note that, in the invention of the present application, within the scope of the invention, free combination of embodiments, modification of any component of each embodiment, or omission of any component in each embodiment can be made.

INDUSTRIAL APPLICABILITY

The wavefront measurement device according to the present invention includes: a light source system illuminating an optical system to be inspected and making light fluxes of a plurality of wavefront measurement visual fields be emitted from the optical system to be inspected; a single wavefront sensor calculating wavefront aberration on a basis of measurement of the light fluxes of the plurality of wavefront measurement visual fields emitted from the optical system to be inspected; and an optical path optical system selectively making the light fluxes of the plurality of wavefront measurement visual fields emitted from the optical system to be inspected be incident on the wavefront sensor. As a result of this configuration, the wavefront aberration of the optical system to be inspected can be calculated in the plurality of visual fields with the single wavefront sensor, so that the wavefront measurement device according to the present invention is suitable for assembly and adjustment of imaging lenses.

REFERENCE SIGNS LIST

1: Surface light source, 2, 12: Transmission pattern mask, 3: Optical system to be inspected, 4A, 4B, 5A, 5B, 14A, 14B, 15A, 15B: Lens, 6A, 6B, 16A, 16B: Image transfer means, 7, 13A, 13B: Folding plane mirror, 8, 18: Wedge prism, 9: Lens array, 10: Imaging element, 11: Arithmetic device, 17: Prism driving mechanism, 19: Storage device, 20: Driving device, 21: Lens, 22, 23, 24, 25: Through hole, 26, 29: Light source system, 28: Wavefront sensor, 27, 30: Wavefront measurement system, 31, 32: Optical path optical system

The invention claimed is:

1. A wavefront measurement device comprising:
   a light source system illuminating an optical system to be inspected and making light fluxes of a plurality of wavefront measurement visual fields be emitted from the optical system to be inspected;
   a single wavefront sensor calculating wavefront aberration on a basis of measurement of the light fluxes of the plurality of wavefront measurement visual fields emitted from the optical system to be inspected; and
   an optical path optical system selectively making the light fluxes of the plurality of wavefront measurement visual fields emitted from the optical system to be inspected be incident on the wavefront sensor, wherein
   the optical path optical system is arranged such that the light fluxes of the plurality of wavefront measurement visual fields emitted from the optical system to be inspected travel in different light paths, and at least one of the light fluxes is incident on the wavefront sensor via a return plane mirror and a wedge prism.

2. The wavefront measurement device according to claim 1, wherein
   the light fluxes of the plurality of wavefront measurement visual fields being made by the light source system be emitted from the optical system to be inspected include a first light flux emitted coaxially with an optical axis of the optical system to be inspected and a second light flux emitted at a wide angle from the optical system to be inspected, and
   the optical path optical system includes: a first folding plane mirror reflecting the second light flux; and a first wedge prism refracting the second light flux reflected by the first folding plane mirror such that the second light flux is parallel to the first light flux and does not overlap with the first light flux, wherein the light fluxes are selectively incident on different areas on the wavefront sensor by making the first light flux be incident on a first area on the wavefront sensor and making the second light flux refracted by the first wedge prism be incident on a second area different from the first area on the wavefront sensor.

3. The wavefront measurement device according to claim 1, wherein
   the light fluxes of the plurality of wavefront measurement visual fields being made by the light source system be emitted from the optical system to be inspected include a third light flux and a fourth light flux each emitted at a wide angle from the optical system to be inspected, and the optical path optical system includes: a second folding plane mirror reflecting the third light flux; a third folding plane mirror reflecting the fourth light flux; a second wedge prism refracting the third light flux reflected by the second folding plane mirror and the fourth light flux reflected by the third folding plane mirror and making one of the light fluxes to be incident on the wavefront sensor; and a prism driving mechanism selectively switching the one of the light fluxes to be incident on the wavefront sensor by rotating the second wedge prism.

4. The wavefront measurement device according to claim 2, wherein
the optical path optical system includes: a first image transfer unit arranged on an optical path of the first light flux, and transferring an image on the optical system to be inspected to the wavefront sensor; and a second image transfer unit arranged at a position on an optical path of the second light flux and between the first folding plane mirror and the first wedge prism, and transferring an image on the optical system to be inspected to the wavefront sensor via the first wedge prism.

5. The wavefront measurement device according to claim 3, wherein
the optical path optical system includes: a third image transfer unit arranged on an optical path of the third light flux and between the second folding plane mirror and the second wedge prism, and transferring an image on the optical system to be inspected to the wavefront sensor via the second wedge prism; and a fourth image transfer unit arranged on an optical path of the fourth light flux and between the third folding plane mirror and the second wedge prism, and transferring an image on the optical system to be inspected to the wavefront sensor via the second wedge prism.

6. The wavefront measurement device according to claim 1, wherein the light source system includes: a surface light source; and a transmission pattern mask emitting the light fluxes of the plurality of wavefront measurement visual fields by being illuminated by the surface light source.

7. The wavefront measurement device according to claim 1, wherein the wavefront sensor includes: a lens array splitting and focusing a light flux; an imaging element imaging focused spots of the lens array; and an arithmetic device calculating wavefront aberration from an image imaged by the imaging element.

8. The wavefront measurement device according to claim 7, wherein the arithmetic device divides the image imaged by the imaging element into divided images corresponding to the plurality of wavefront measurement visual fields and calculates the wavefront aberration for each of the divided images.

9. An optical system assembly device comprising:
an optical system to be inspected which is subjected to wavefront measurement;
a light source system illuminating the optical system to be inspected and making light fluxes of a plurality of wavefront measurement visual fields be emitted from the optical system to be inspected;
a single wavefront sensor calculating wavefront aberration on a basis of measurement of the light fluxes of the plurality of wavefront measurement visual fields emitted from the optical system to be inspected;
an optical path optical system selectively making the light fluxes of the plurality of wavefront measurement visual fields emitted from the optical system to be inspected be incident on the wavefront sensor; and
a driving device moving the optical system to be inspected on a basis of an amount of movement of the optical system to be inspected calculated by the wavefront sensor using the wavefront aberration and an aberration sensitivity of the optical system to be inspected, wherein
the optical path optical system is arranged such that the light fluxes of the plurality of wavefront measurement visual fields emitted from the optical system to be inspected travel in different light paths, and at least one of the light fluxes is incident on the wavefront sensor via a return plane mirror and a wedge prism.

10. The optical system assembly device according to claim 9, wherein
the light fluxes of the plurality of wavefront measurement visual fields being made by the light source system be emitted from the optical system to be inspected include a first light flux emitted coaxially with an optical axis of the optical system to be inspected and a second light flux emitted at a wide angle from the optical system to be inspected, and
the optical path optical system includes: a first folding plane mirror reflecting the second light flux; and a first wedge prism refracting the second light flux reflected by the first folding plane mirror such that the second light flux is parallel to the first light flux and does not overlap with the first light flux, wherein the light fluxes are selectively incident on different areas on the wavefront sensor by making the first light flux be incident on a first area on the wavefront sensor and making the second light flux refracted by the first wedge prism be incident on a second area different from the first area on the wavefront sensor.

11. The optical system assembly device according to claim 9, wherein
the light fluxes of the plurality of wavefront measurement visual fields being made by the light source system be emitted from the optical system to be inspected include a third light flux and a fourth light flux each emitted at a wide angle from the optical system to be inspected, and
the optical path optical system includes: a second folding plane mirror reflecting the third light flux; a third folding plane mirror reflecting the fourth light flux; a second wedge prism refracting the third light flux reflected by the second folding plane mirror and the fourth light flux reflected by the third folding plane mirror and making one of the light fluxes to be incident on the wavefront sensor; and a prism driving mechanism selectively switching the one of the light fluxes to be incident on the wavefront sensor by rotating the second wedge prism.

12. The optical system assembly device according to claim 10, wherein
the optical path optical system includes: a first image transfer unit arranged on an optical path of the first light flux, and transferring an image on the optical system to be inspected to the wavefront sensor; and a second image transfer unit arranged at a position on an optical path of the second light flux and between the first folding plane mirror and the first wedge prism, and transferring an image on the optical system to be inspected to the wavefront sensor via the first wedge prism.

13. The optical system assembly device according to claim 11, wherein the optical path optical system includes: a third image transfer unit arranged on an optical path of the third light flux and between the second folding plane mirror and the second wedge prism, and transferring an image on the optical system to be inspected to the wavefront sensor via the second wedge prism; and a fourth image transfer unit arranged on an optical path of the fourth light flux and between the third folding plane mirror and the second wedge prism, and transferring an image on the optical system to be inspected to the wavefront sensor via the second wedge prism.

14. The optical system assembly device according to claim 9, wherein the light source system includes: a surface light source; and a transmission pattern mask emitting the light fluxes of the plurality of wavefront measurement visual fields by being illuminated by the surface light source.

15. The optical system assembly device according to claim 9, wherein the wavefront sensor includes: a lens array splitting and focusing a light flux; an imaging element imaging focused spots of the lens array; and an arithmetic device calculating wavefront aberration from an image imaged by the imaging element.

16. The optical system assembly device according to claim 15, wherein the arithmetic device divides the image imaged by the imaging element into divided images corresponding to the plurality of wavefront measurement visual fields and calculates the wavefront aberration for each of the divided images.

17. The optical system assembly device according to claim 9, further comprising a storage device storing the aberration sensitivity of the optical system to be inspected.

* * * * *